Patented Sept. 2, 1941

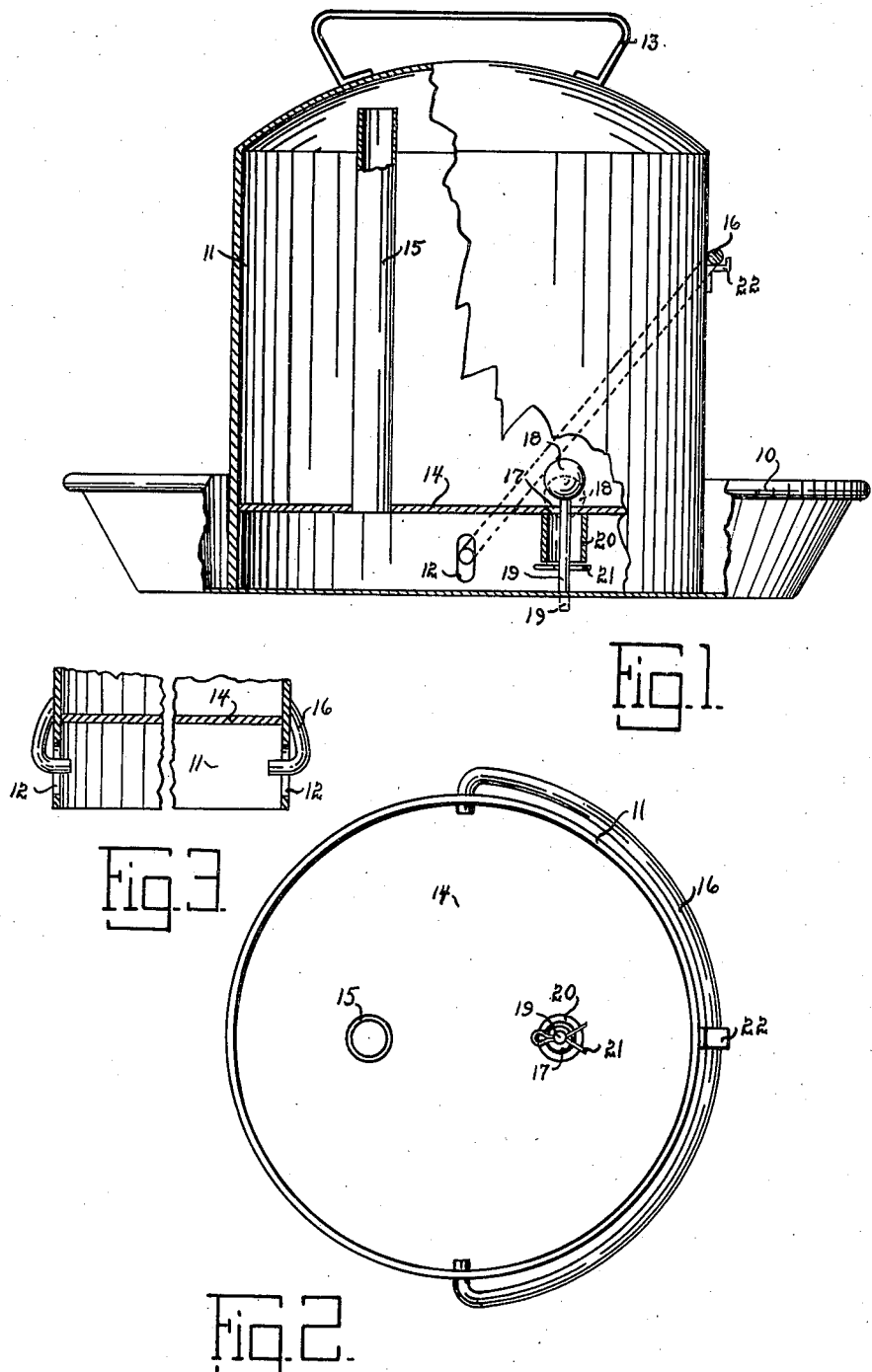

2,254,584

UNITED STATES PATENT OFFICE 2,254,584

POULTRY WATERING FOUNTAIN

Clifford A. Tornell, Pilot Mound, Iowa

Application October 27, 1939, Serial No. 301,611

7 Claims. (Cl. 119—77)

The principal object of my invention is to provide a poultry watering fountain that is easily filled and serviced and which may be carried in its normal position by the user without spilling the fluid therefrom.

A further object of my invention is to provide a poultry watering fountain that is automatically sealed when in position in a watering trough and one which may be picked up at any time without losing the balance of the water or like within the container.

A still further object of my invention is to provide a poultry watering fountain that is extremely economical to manufacture and is durable and efficient in use.

These and other objects will be apparent to those skilled in the art.

My invention consists in the construction, arrangement, and combination of the various parts of the device, whereby the objects contemplated are attained as hereinafter more fully set forth, pointed out in my claims and illustrated in the accompanying drawing, in which:

Fig. 1 is a side partial sectional view of my poultry watering fountain ready for use, and Fig. 2 is a bottom plan view, and Fig. 3 is a side sectional view of a portion thereof.

There are numerous chicken and poultry watering fountains now on the market consisting of a container for holding water and leg members for holding the container spaced above a pan. The design of these watering fountains is such that they are to be inverted into a pan, thereby keeping the water level in the pan constant for providing drinking water or fluid food and tonic to poultry or the like. A disadvantage of many watering fountains is that they are filled through the same opening from which they dispense the fluid, and it is necessary for the user to carry the device in an upright position and then quickly overturn the device into the pan. This is very messy in addition to being quite a chore and whenever the container is lifted from the pan for refilling or replenishing the supply of fluid, the remaining fluid in the container rushes out, thereby flooding the pan and losing the fluid. It is to overcome such objections that I have provided my poultry watering fountain which I will now describe.

I have used the numeral 10 to designate the ordinary type of flat pan usually used in conjunction with a watering fountain and from which the poultry may drink the fluid. My watering fountain is used in conjunction with such a pan.

The numeral 11 designates the container portion of my device having a diameter considerably less than the inside diameter of the pan 10.

The numerals 12 indicate two diametrically opposite vertical slots cut adjacent the lower rim portion of the container 11 and whose function will hereinafter be described.

The numeral 13 indicates a handle member rigidly secured to the upper portion of the container 11 for carrying the same. The bottom portion or dividing partition of the container 11 I have designated by the numeral 14. It will here be noted that this bottom portion 14 is spaced upwardly from the plane of the bottom of the container forming an extension or skirt below the bottom portion 14 for housing the various elements of the device hereinafter described and to permit a suitable water depth in the pan 10 when the device is in operation.

The numeral 15 indicates a filling pipe extending through and rigidly secured to, by soldering or like, the bottom of the portion 14. This filling pipe extends to a point near the top portion of the container 11, as shown in Fig. 1 of the drawing. It will be here noted that the end of or opening into the pipe 15 will be under water when the device is in a normal position and after the water has filled to the desired level within the pan 10, it will provide a water seal over the open end of the pipe 15 and prevent the water from rushing out of the container beyond the limit of the pan 10.

The numeral 16 indicates a handle bail member having its end portions bent inwardly for rotatable and slidable engagement with the slots 12 as shown in the drawing.

The numeral 17 indicates a valve seat aperture cut through the bottom portion 14.

The numeral 18 indicates a ball valve capable of being seated in the aperture 17 at times and preventing the escape of water from inside the container 11 when the ball valve is positioned on the valve aperture 17.

The numeral 19 indicates an ordinary valve stem rigidly secured to the release valve or like 18 and extending downwardly.

I have used the numeral 20 to indicate a tube having its upper end secured to the partition 14 and in communication with the valve seat aperture 17. The valve rod 19 extends through the center of this tube 20 and is held from leaving the tube 20 by a cotter key or like 21 which prevents the valve assembly from falling into the container when the container 11 is inverted for filling or the like. By this construction, the valve 18 will drop onto the valve seat 17 by force of gravity when the device is in the position shown in Fig. 1 but not in contact with the pan 10. It will here be noted that the valve stem 19 extends below the bottom limits of the container 11 when the valve is closed and the pressure from the container being set in the pan 10 will force the valve rod 19 upwardly, thereby opening the ball valve 18, as shown in the drawing.

I have used the numeral 22 to indicate a lug member rigidly secured to the side of the container 11, as shown in Fig. 1. The purpose of this lug 22 is to receive and hold the bail when the device is functioning as a watering fountain. Due to the fact that the ends of the bail 16 are journalled in the slots 12, there is plenty of tolerance within the slots 12 to permit the bail to be hooked or unhooked onto or from this lug 22. This prevents the handle bails from interfering while poultry or the like are drinking from the pan 10.

The practical operation of my device is as follows. The container 11 with its component parts is inverted and water or other fluid introduced into the open end of the pipe 15 and into the container 11.

During this operation, the force of gravity will cause the ball valve to drop downwardly, thereby opening this valve and permitting the air to escape from the container 11, as the container fills with fluid. When the device is filled and is then turned right side up, the ball valve will close the aperture 17, preventing water from escaping at this point.

The water level within the container or housing 11 will normally be below the level of the uppermost portion of the pipe 15. The valve 18 will be closed and the user may then grasp the handle 13 and now the device is in a normal upright attitude. The fountain is then placed into the pan 10 and in so doing the valve stem 19 contacts the bottom portion of the pan, thereby opening the valve 18, permitting the water in the container to flow out into the pan until it has formed a normal water seal level with the bottom 14 of the container 11.

The water flows through the slots 12 and into the pan 10. If it is desired to replenish the supply of fluid in the container 11, all that is necessary for the user to do is to lift the container 11 upwardly, thereby permitting the ball valve 18 to close and preventing further leakage of water from within the container 11.

My device requires no filler opening that has to be closed with a screw cap, cork, or the like, and, therefore, has nothing to become loose or lost connected therewith as the filler opening is self-sealing, thereby making my device foolproof in construction.

Thus, it will be seen that I have provided a poultry watering fountain which may be easily filled, which will not permit flooding of the watering pan, which may be carried in a normal upright position without permitting the fluid therein to spill, which permits the water within the container to be replenished from time to time without losing the water or the fluid already within the container, which provides an air releasing valve when filling the device, and which presents many more obvious advantages, thereby fulfilling all of my objects. Obviously, my container portion may be made of any shape or size and the valve may be of any suitable shape performing the same function.

Some changes may be made in the construction and arrangement of my improved poultry watering fountain without departing from the real spirit and purpose of my invention, and it is my intention to cover by my claims any modified forms of structure or use of mechanical equivalents which may be reasonably included within their scope.

I claim:

1. In a poultry watering fountain, a container designed to be filled with the fluid, slot openings cut in the side walls of said container adjacent its lower edge; said container designed to be placed in a pan of larger dimensions than said container, a partition in said container above said slot openings, a filling pipe extending through the partition of said container and extending to a point adjacent the inside top of said container; said pipe having one of its ends terminating adjacent said partition, a gravity-operated valve member positioned in the bottom portion of said container for permitting the fluid to flow from said container at times, and an elongated stem on said valve capable of contacting the inside bottom portion of the pan when said container is in position therein and opening said valve.

2. In a device of the class described, a hollow container designed to be filled with a fluid, a pan portion of greater diameter than the diameter of said container, a means for spacing the bottom portion of said container from the inside bottom portion of said pan when said container is in an upright position, a filling pipe extending through the bottom portion of said container and to a position adjacent the inside top portion of said container when said container is in an upright position; said pipe having one of its ends terminating adjacent the bottom portion of said container, and a valve mechanism positioned in the bottom of said container for permitting water to flow from said container into said pan when said container is resting in a normal position in said pan.

3. In a device of the class described, a pan portion, a container of smaller diameter than the inside diameter of said pan, an extension on the lower end of said container, slots in said extension portion, a filling pipe extending through the bottom of said container to a point adjacent the inside top of said container for filling said container with a fluid when said container is in an inverted position; said pipe having one of its ends terminating adjacent the bottom portion of said container, a valve member positioned in the bottom of said container closing an opening therein and capable of operatively contacting the inside bottom of said pan for opening said valve member, said valve member being normally in a yieldably closed position.

4. In a device of the class described, a container designed to hold a fluid, a handle member on the upper side of said container, a bottom portion positioned above the lower end of said container having a valve seat opening therein, slots cut in said container below said bottom portion, a pan member of greater diameter than the diameter of said container and of a depth greater than the height of said bottom portion above the lower end of said container, a filler pipe extending through said bottom portion of said container and extending to a point adjacent the top of said container; said pipe having one of its ends terminating adjacent the bottom portion of said container, a valve mechanism positioned in said bottom portion, and a means for opening said valve when the lower end of said container is in position in said pan member.

5. In a device of the class described, a pan member, a container having a diameter less than the diameter of said pan member and designed to contain a fluid, a bottom portion in said container having an opening therein and positioned above the lower end of said container, a gravity valve element positioned in said opening, a means for opening said valve when said container is placed in said pan member, a filling pipe extending from adjacent said bottom portion upwardly to a point adjacent the inside top portion of said container, two diametrically opposite slots cut in the lower end portion of said container and below said bottom portion, and a bail member having its end portions bent and in slidable, rotatable engagement with said slots.

6. In a device of the class described, a pan member, a container having a diameter less than the diameter of said pan member and designed to contain a fluid, a bottom portion in said container having an opening therein and positioned above the lower end of said container, a gravity valve element positioned in said opening, a means for opening said valve when said container is placed in said pan member, a filling pipe extending from adjacent said bottom portion upwardly to a point adjacent the inside top portion of said container, two diametrically opposite slots cut in the lower end portion of said container and below said bottom portion, a bail member having its end portions bent and in slidable, rotable engagement with said slots, and a lug rigidly secured to the side wall of said container for engaging and holding said bail member when said container is in a normal operative position.

7. The combination in a device of the type described of a pan member, a container having a diameter less than the diameter of said pan member and designed to contain a fluid, a bottom portion in said container having an opening therein and positioned above the lower end of said container, a gravity valve element positioned in said opening, a downwardly extending valve stem on said gravity valve of a length such that when said container is placed in said pan the lower end of said valve stem presses on the inside bottom of said pan causing the gravity valve to be opened, and a filling pipe extending from adjacent said bottom portion upwardly to a point adjacent the inside top portion of said container, its lower end opening beneath said bottom portion.

CLIFFORD A. TORNELL.